Figure 1:
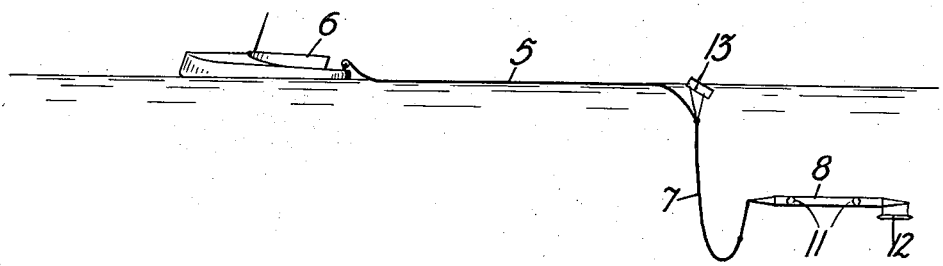

March 18, 1924.

G. F. ATWOOD 1,487,138

METHOD OF DETECTING THE DIRECTION OF UNDERWATER VIBRATIONS

Filed June 24, 1919

Inventor:
George F. Atwood
by J. E. Roberts   Att'y.

Patented Mar. 18, 1924.

1,487,138

UNITED STATES PATENT OFFICE.

GEORGE F. ATWOOD, OF NEWARK, NEW JERSEY, ASSIGNOR TO WESTERN ELECTRIC COMPANY, INCORPORATED, OF NEW YORK, N. Y., A CORPORATION OF NEW YORK.

METHOD OF DETECTING THE DIRECTION OF UNDERWATER VIBRATIONS.

Application filed June 24, 1919. Serial No. 306,461.

*To all whom it may concern:*

Be it known that I, GEORGE F. ATWOOD, a citizen of the United States, residing at Newark, in the county of Essex, State of New Jersey, have invented certain new and useful Improvements in the Method of Detecting the Direction of Underwater Vibrations, of which the following is a full, clear, concise, and exact description.

This invention relates to the method of and instrumentalities for detecting the direction of under-water vibrations and particularly to the method of detecting vibrations in the water set up by submarine signaling apparatus or by the movement of a distant submarine vessel. For this purpose, various arrangements have been proposed in which a sound detecting device is towed behind a vessel or is allowed to drift and means are provided for determining the direction of a source of sound affecting the detecting apparatus. In such devices, however, difficulty has been experienced, due to the fact that the device in which the detecting apparatus is located, commonly referred to as a fish, does not remain on an even keel except when the towing vessel is in motion, and, where a plurality of detecting devices are mounted within the device being towed, it is necessary that these detectors be located on a known base line in order to make the measurements necessary to accurately determine the location of the source of sound. Moreover, when drifting, difficulty is often experienced in that in shallow water the towing cable may rest upon the bottom and become fouled.

It is therefore an object of the present invention to provide a method of and instrumentalities for towing, in which the device containing the detectors remains under the surface of the water and on approximately an even keel irrespective of whether the device is being towed or is simply drifting.

Another object of this invention is to provide a method whereby listening may commence at approximately the time the towed device is placed in the water.

To accomplish these objects, and in accordance with a feature of this invention, there is provided a towing cable, one portion of which has a positive buoyancy and therefore floats upon the water when not in motion, while the other portion has negative buoyancy. This cable is used in combination with a towed device or fish having a definite amount of positive buoyancy dependent upon the depth of water in which it is to be used and a winch which permits the apparatus being handled quickly and with ease when it is placed in the water or removed therefrom.

Figure 2:
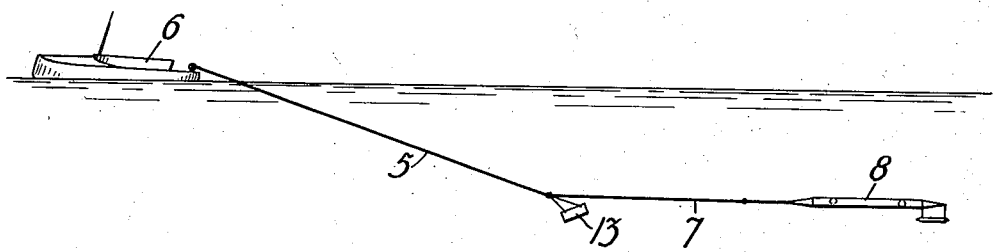
Figure 3:
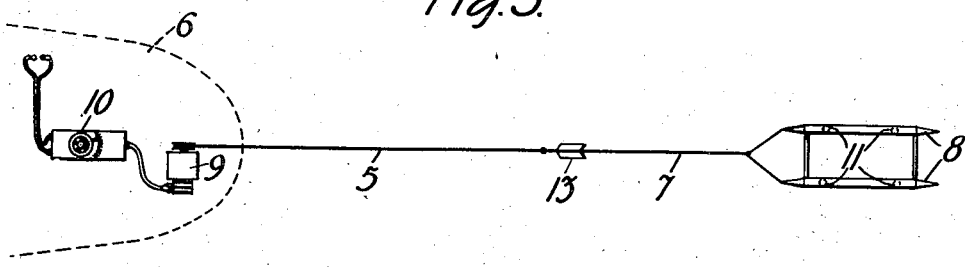

The various features of the invention may be more clearly understood by reference to the accompanying drawing, in which Fig. 1 is a view showing the relative positions of the apparatus when the towing vessel is drifting; Fig. 2 shows the relative positions of the apparatus when the towing vessel is in motion; and Fig. 3 is a plan view showing the winch and listening apparatus mounted on the stern of the towing vessel and a type of towed device in which four separate detectors are employed.

Referring to the drawings, there is employed a section of floatation cable 5 which is lighter than water and therefore floats upon the surface when the towing vessel 6 is not in motion. This section of cable is joined to a section of cable 7 heavier than water and having its other end attached to the towed device or fish 8. The purpose of making this section of cable heavier than water is to keep the buoyant fish 8 under water when the towing vessel is not in motion. The depth at which the fish will remain under water when not being towed depends on the length of this section of heavier than water cable, its weight per unit of length, and the amount of positive buoyancy possessed by the fish. A preferred type of floatation cable is disclosed in a co-pending application of Walter L. Thompson and Arthur A. Catlin, Serial No. 306,473, filed June 24, 1919. Where the two sections of cable are joined there is provided a V-shaped float 13, commonly referred to as a kite, the purpose of which is to maintain the fish at a given distance under the surface of the water when the device is being towed and to act as a buoy to partly support the section of heavier than water cable between the kite and the fish when the device is not in motion. This result is accomplished by the pressure of the water against the kite which tends to force the kite downward until a point is reached where this force is compensated for by the upward pull exerted by the towing cable 5. For a given speed the kite therefore remains at this point and the section of cable 7 exerts a horizontal pull upon the fish 8 which is therefore maintained on an even keel. The opposite end of the floatation cable is carried to a winch 9 located on the deck of the towing vessel and the conductors of the cable are connected to a comparing device 10. The winch, which forms no part of the present invention, is shown in detail in my co-pending application Serial No. 306,462, filed June 24, 1919, which matured on Nov. 15, 1921 to patent numbered 1,396,721, and is arranged to permit the cable being rapidly paid-out or hauled in without causing kinking or undue strain. The comparing device comprises means cooperating with the detectors 11—11, mounted within the fish and at a given distance apart, for determining the direction of the source of sound and includes a pair of receivers having adjustable listening tubes attached thereto. Each receiver is connected in series with one of the detectors 11 by means of the conductors of cable sections 5 and 7, and, by adjusting the length of these listening tubes, it is possible to determine binaurally the direction of the source of sound. The fish is also provided with a ballast chamber 12 which offsets the weight of the cable 7 when the device is drifting and allows the fish to remain on an even keel under such a condition.

The method of employing this apparatus for the detection of faint sounds propagated through water is as follows:

When it is proposed to listen for the presence of submarines or other craft producing vibrations in the surrounding water, the fish 8, together with the short-length of cable 7 and the kite 13, is cast overboard, the engines of the towing vessel are stopped or their speed greatly reduced and the floatation cable 5 is paid-out by the winch 9 at a speed approximately that of the towing vessel 6 so that the relative movement between the fish 8 and the water is negligible even before the speed of the towing vessel is appreciably reduced. Thus, conditions obtain, with reference to the fish 8, as shown in Fig. 1,—the fish drifting even though the ship is moving forward. It, therefore, becomes possible to make use of the listening apparatus almost immediately upon its being placed in the water and without waiting for the vessel to come to a full stop. At other times it has been found advisable to tow the fish close up and when ready to make an observation the engines are stopped and simultaneously the cable is paid-out practically at the speed at which the towing vessel advances through the water. By this means the noise, due to the rush of water passing the fish is practically eliminated and it has been found possible to determine the location of the sound without the towing vessel losing an appreciable amount of headway since the necessary reading can be obtained and the engines started again within a period of one minute. While the disturbances caused by the rush of water and also the disturbances caused by the propeller of the towing vessel prevent satisfactory operation when moving at a high rate of speed, the employment of the floatation cable in such a manner that the fish 8 is on practically an even keel, and always under water irrespective of whether it is in motion or not, makes it possible to use the listening apparatus when the device is being towed at a low rate of speed.

What is claimed is:

1. The method of detecting the direction of under-water vibrations which consists in towing a submersible device equipped with a detector, decreasing the speed of the towing vessel, maintaining the towed device under the water and on an even keel independent of the strain on the towing cable, and noting the response of the detector.

2. The method of detecting the direction of under-water vibrations which consists in towing a submersible device equipped with detectors, stopping the motion of the towing vessel, maintaining the towed device under the water and on an even keel independent of the strain on the towing cable and noting the response of the detectors.

3. The method of detecting under-water vibrations which consists in towing a submersible device equipped with detectors, decreasing the speed of the towing vessel, compensating for the weight of the cable to maintain the towed device under the water and on an even keel, and noting the response of the detectors.

4. The method of detecting under-water vibrations which consists in towing a submersible device equipped with detectors, decreasing the speed of the towing vessel, automatically compensating for the weight of the cable to maintain the towed device under the water and on an even keel, and noting the response of the detectors.

5. The method of detecting and determining the direction of an under-water source of sound which consists in towing a sound-responsive device below the surface of the water, periodically removing the towing force and supporting a portion of the towing cable independent of the towed device and operatively associating said sound-responsive device with an indicating instrument.

6. In apparatus for the detection of under-water vibrations, the combination with a towing vessel of a towed device having positive buoyancy, a towing cable comprising a section having positive buoyancy and a section having negative buoyancy, and means for paying-out said cable.

7. In apparatus for the detection of under-water vibrations, the combination with a towing vessel of a towed device having positive buoyancy and a cable for towing said device, said cable comprising a section having positive buoyancy and including conductors for electrically connecting the towed device with apparatus on the towing vessel.

In witness whereof, I hereunto subscribe my name this 16th day of June A. D., 1919.

GEORGE F. ATWOOD.